US010102776B2

(12) United States Patent
Beale et al.

(10) Patent No.: US 10,102,776 B2
(45) Date of Patent: Oct. 16, 2018

(54) SIMULATION DEVICE AND METHOD FOR USING SAME

(71) Applicant: Warsaw Orthopedic, Inc, Warsaw, IN (US)

(72) Inventors: Jeffrey W. Beale, Bartlett, TN (US); Harold S. Taylor, Memphis, TN (US)

(73) Assignee: Warsaw Orthopedic, Inc., Warsaw, IN (US)

( * ) Notice: Subject to any disclaimer, the term of this patent is extended or adjusted under 35 U.S.C. 154(b) by 149 days.

(21) Appl. No.: 15/354,726

(22) Filed: Nov. 17, 2016

(65) Prior Publication Data

US 2018/0137786 A1    May 17, 2018

(51) Int. Cl.
*G09B 23/32*    (2006.01)

(52) U.S. Cl.
CPC .................................... *G09B 23/32* (2013.01)

(58) Field of Classification Search
None
See application file for complete search history.

(56) References Cited

U.S. PATENT DOCUMENTS

| 2005/0106545 A1* | 5/2005 | Heruth | G09B 23/30 434/267 |
| 2008/0318195 A1* | 12/2008 | Murdach | G09B 23/30 434/274 |
| 2009/0162821 A1* | 6/2009 | Boachie-Adjei | G09B 23/32 434/274 |
| 2016/0012753 A1* | 1/2016 | Mehdian | G09B 23/32 434/274 |
| 2016/0225288 A1* | 8/2016 | East | A61B 17/1671 |

* cited by examiner

*Primary Examiner* — Jason Yen

(57) ABSTRACT

A simulation device and method for using same are provided for simulating a position of a replica human spine due to different pathologies and different surgical positions. The simulation device includes a carrier portion rotatably attached to a base portion. The carrier portion supports a first adjuster, a second adjuster, and a third adjuster for supporting various portions of the replica human spine. The carrier portion and the first, second, third supports affording adjustment of the position of the replica human spine.

20 Claims, 7 Drawing Sheets

SIMULATION DEVICE AND METHOD FOR USING SAME

BACKGROUND OF THE INVENTION

Field of the Invention

The present invention relates to a simulation device or simulator for manipulating a replica human spine. More particularly, the present invention relates to a simulation device or a simulator for manipulating a replica human spine to simulate the different pathologies and the different surgical positions of the human spine. More specifically, the present invention relates to a simulation device or simulator for manipulating a replica human spine capable of adjusting a first portion and a second portion of the replica human spine in three dimensions.

Description of the Prior Art

Surgeries to correct various pathologies related to the human spine are quite common. Such surgeries can serve in repairing defects to the human spine due to disease and/or trauma. Oftentimes, implants, plates, posts, and/or screws are used to aid the repair of spinal defects. However, given the flexibility of the human spine and its position with a human body, it is difficult to visualize for training purposes the position of the human spine without the aid of a physical model. As such, there is a need for a simulation device or simulator facilitating the manipulation of a replica human spine for training purposes. The simulation device or simulator could act as a development device to facilitate the creation of new procedures, implants, instruments, and systems to achieve new and improved spinal surgical procedures.

SUMMARY OF THE INVENTION

The present invention in one preferred embodiment contemplates a simulation device for simulating a position of a replica human spine due to different pathologies and different surgical positions, the simulation device having a base portion including at least a first upright member and a second upright member, the first and second upright members being spaced apart a first distance, a carrier portion rotatably attached to the base portion, the carrier portion including at least a first arm portion, a second arm portion, and a cradle portion attached between the first and second arm portions, the first arm portion being rotatably attached to the first upright member, the second arm portion being rotatably attached to the second upright member, and the first and second arm portions rotating about a rotational axis, the cradle portion including at least a longitudinal member extending approximately the first distance, and the longitudinal member being substantially aligned with the rotational axis; the longitudinal member supporting at least a first adjuster and a second adjuster for positioning and repositioning portions of the replica human spine, the first adjuster including a first adjustment rod, a second adjustment rod, a first collar portion, a second collar portion, and a distal end portion for supporting a first portion of the replica human spine, the first adjustment rod extending outwardly from the longitudinal member, the first collar portion being movably attached to the first adjustment rod, the first and second collar portions being rotatably attached to one another, the second adjustment rod being movably attached to the second collar portion, and the distal end portion being attached to the second adjustment rod, wherein the first collar portion is movable via adjustment relative to the first adjustment rod in a first direction, and the second adjustment rod is movable via adjustment relative to the second collar portion in a second direction, the adjustment of the first adjuster affording positioning and repositioning of the distal end portion and the first portion of the replica human spine supported thereby, and the second adjuster including a first gear mechanism, a first rotatable shaft, and an armature portion for supporting a second portion of the replica human spine, the armature portion being attached to the first rotatable shaft, the first rotatable shaft being rotatably adjustable by the first gear mechanism, wherein the armature portion is moveable via adjustment of the first rotatable shaft, the adjustment of the second adjuster affording positioning and repositioning of the armature portion and second portion of the replica human spine supported thereby.

The present invention in another preferred embodiment contemplates a simulation device for simulating a position of a replica human spine due to different pathologies and different surgical positions, the simulation having a first upright member and a second upright member, the first and second upright members being spaced apart a first distance, a carrier portion including at least a first arm portion, a second arm portion, and a cradle portion attached between the first and second arm portions, the first arm portion being rotatably attached to the first upright member and the second arm portion being rotatably attached to the second upright member, the first and second arm portions rotating about a rotational axis, the cradle portion including at least a longitudinal member being substantially aligned with the rotational axis, a first adjuster supported by the longitudinal member of the cradle portion, the first adjuster including a first adjustment rod, a second adjustment rod, a first collar portion, a second collar portion, and a distal end portion attached to the second adjustment rod for supporting a first portion of the replica human spine, the first and second collar portions being attached to one another, the first collar portion being moveably attached to the first adjustment rod, the second adjustment rod being moveably attached to the second collar portion, wherein the first collar portion is movable via adjustment relative to the first adjustment rod in a first direction, and the second adjustment rod is movable via adjustment relative to the second collar portion in a second direction, the adjustment of the first adjuster affording positioning and repositioning of the distal end portion and the first portion of the replica human spine supported thereby, and a second adjuster supported by the longitudinal member of the cradle portion, the second adjuster including a first gear mechanism, a first rotatable shaft, and an armature portion for supporting a second portion of the replica human spine, the armature portion being attached to the first rotatable shaft, the first rotatable shaft being rotatably adjustable by the first gear mechanism, wherein the armature portion is moveable via adjustment of the first rotatable shaft, the adjustment of the second adjuster affording positioning and repositioning of the armature portion and second portion of the replica human spine supported thereby.

The present invention in yet another preferred embodiment contemplates a method of simulating positions of a human spine due to different pathologies and different surgical positions using a replica human spine and a simulation device, the method including positioning the simulation device on a support surface, the height of the simulation device approximating a height of a patient during surgery on the spine of the patient, supporting a first portion of the replica human spine on a first adjuster of the simulation device, the first adjuster including a first adjustment rod, a second adjustment rod, a first collar portion, a second collar portion, and a distal end contacting the first portion of the replica human spine, supporting a second portion of the replica human spine on a second adjuster of the simulation device, the second adjuster including a first gear mechanism and an armature portion contacting the second portion of the replica human spine, adjusting the position of the distal end of the first adjuster and the first portion of the replica human spine by at least one of moving the first collar portion relative to the first adjustment rod, moving the second adjustment rod relative to the second collar portion, and rotating the first and second collar portions relative to one another, and adjusting the position of the armature portion of the second adjuster and the second portion of the replica human spine by actuating the first gear mechanism to rotate the armature portion, wherein the adjustment of the first and second adjusters serve to articulate positions of the first and second portions of the replica human spine to simulate the different pathologies and the different surgical positions of the human spine.

These and other objects of the present invention will be apparent from review of the following specification and the accompanying drawings.

BRIEF DESCRIPTION OF THE DRAWINGS

The accompanying drawings, which are incorporated in and constitute a part of the specification, illustrate preferred embodiments of the invention. Together with the description, they serve to explain the objects, advantages and principles of the invention. In the drawings.

DETAILED DESCRIPTION OF THE PREFERRED EMBODIMENT

Figure 1:
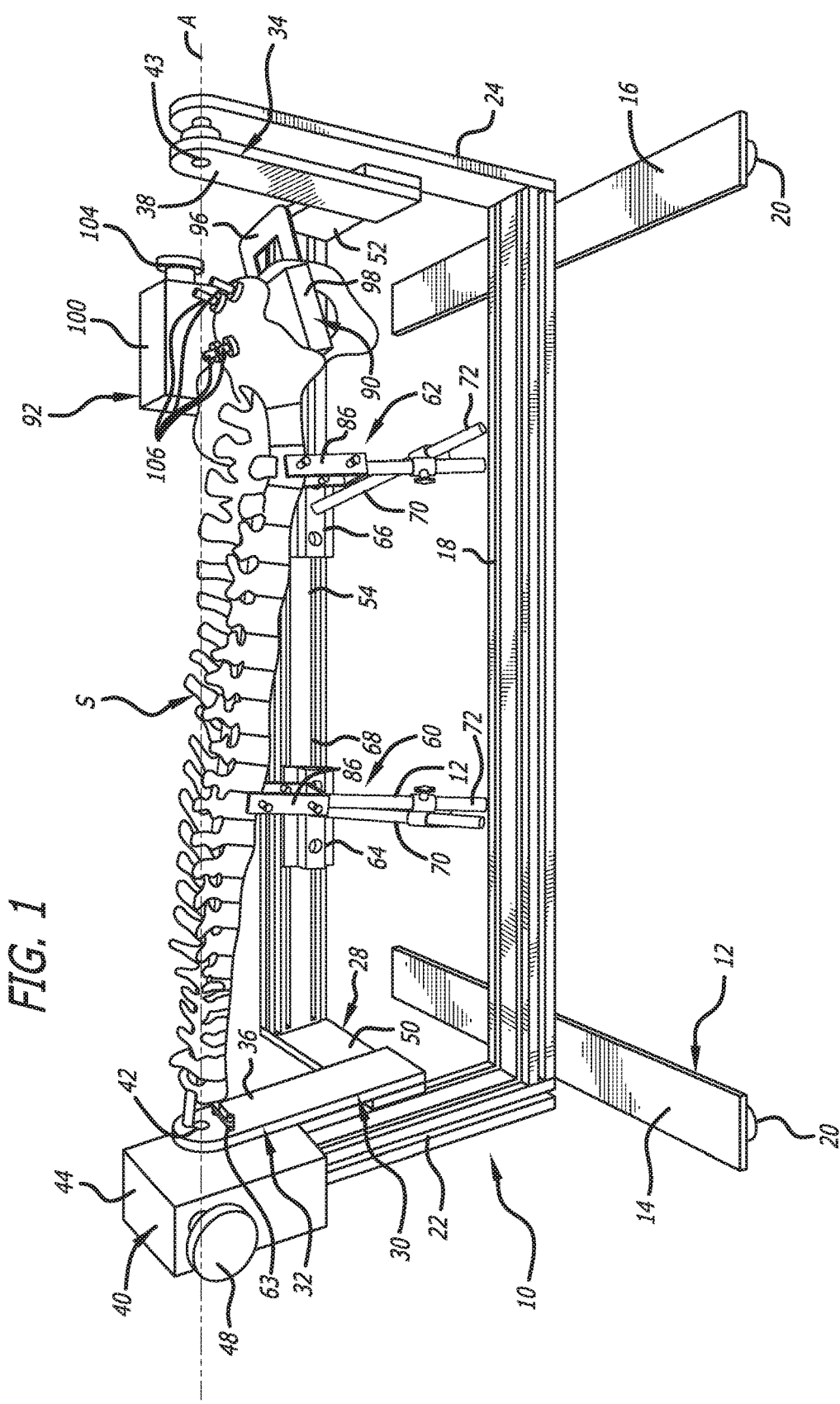
FIG. 1 is a front top perspective view of a simulation device or simulator used for manipulating a replica human spine.
Figure 2:
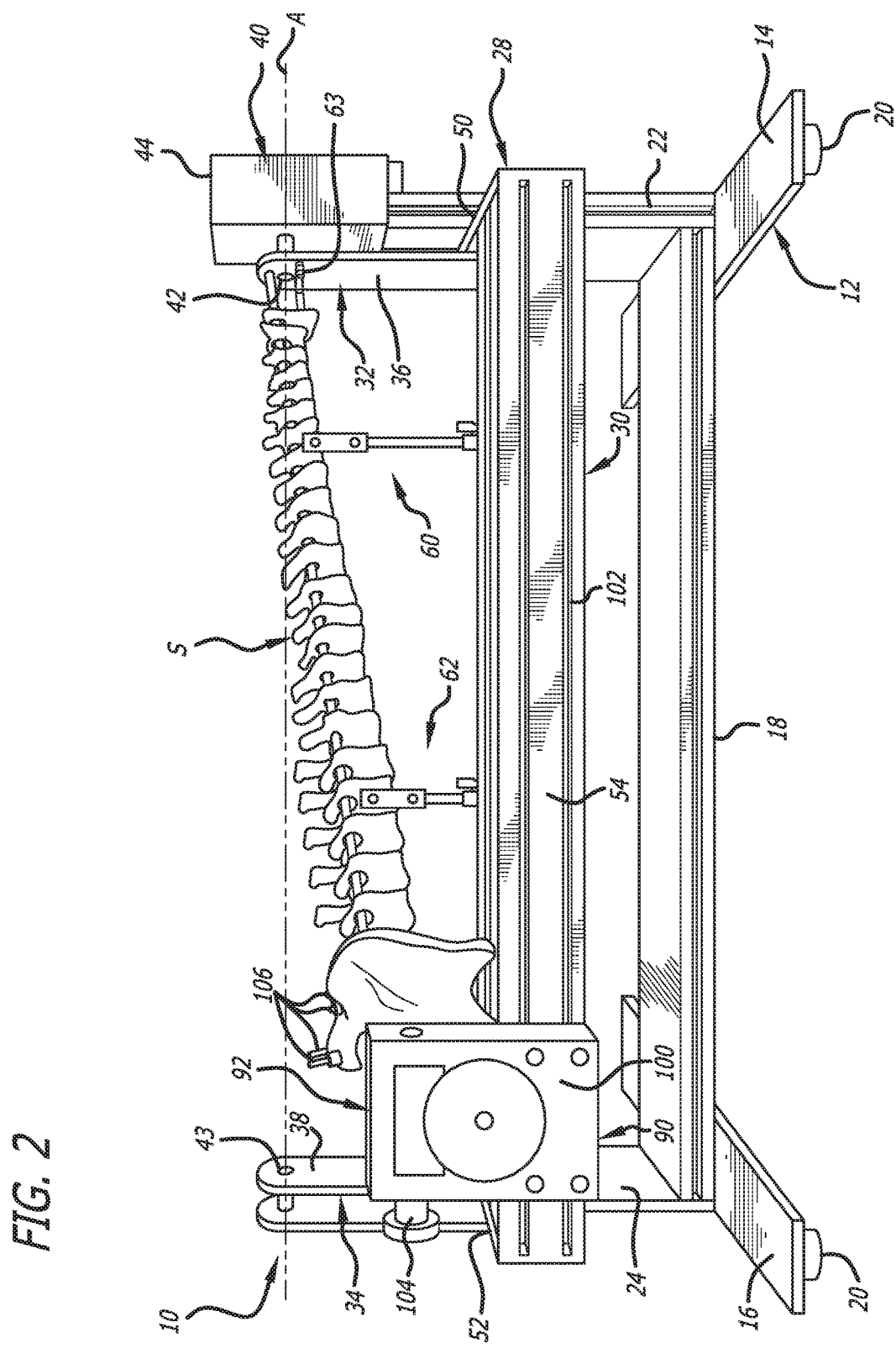
FIG. 2 is a rear perspective view of the simulation device or simulator of FIG. 1.
Figure 3:
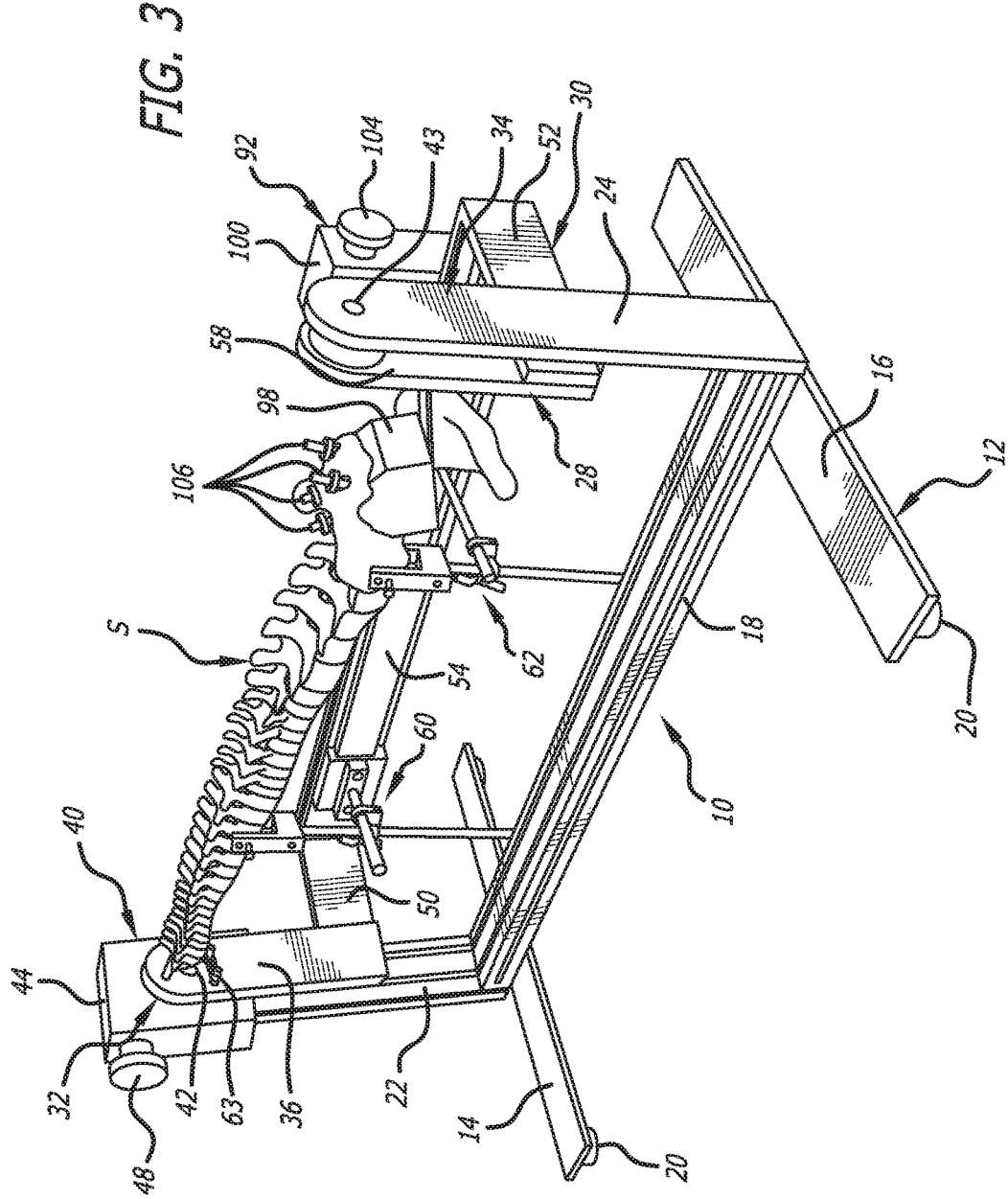
FIG. 3 is a front perspective view from one end of the simulation device or simulator of FIG. 1.

A simulation device or simulator is generally indicated by the numeral 10 in FIGS. 1-3. The simulator 10 is used to manipulate a replica human spine S to simulate the position of a human spine during surgery performed thereon. Using the simulator 10, the replica human spine S can be positioned and repositioned to simulate a human spine affected by different pathologies, and can be positioned and repositioned to simulate the different surgical positions of a human spine during different surgical procedures performed thereon. The different surgical positions can include prone, supine, lateral, anterolateral, and posterolateral.

The simulator 10 can be used to manipulate portions of the replica human spine in at least three (3) dimensions. The simulator 10 is sized to be received on a table approximating the height of a surgical table, such that the replica human spine S is ultimately positioned at a height approximating the height of a patient's spine during surgery. As discussed below, the simulator 10 serves as an aid for training purposes to allow surgeons to visualize the position of a human spine affected by different pathologies and/or in different positions to afford different surgical procedures.

As depicted in FIGS. 1-3, the simulator 10 includes a base portion 12 having a first support member 14, a second support member 16, and a connecting member 18 joining the first and second support members 14 and 16 to one another. The first and second support members 14 and 16 serve as legs, and extend outwardly from the connecting member 18 to provide stability to the remainder of the simulator 10. Rubber mounts 20 attached to the first and second support members 14 and 16 can be used in supporting the simulator 10 on a selected work surface.

The base portion 12 also includes a first upright member 22 and a second upright member 24 spaced apart by the connecting member 18. The first upright member 22 extends upwardly from the connecting member 18 adjacent the first support member 14, and the second upright member 24 extends upwardly from the connecting member 18 adjacent the second support member 16. As discussed below, the first and second upright members 22 and 24 are used in supporting a rotatable carrier 28 therebetween. While the first and second upright members 22 and 24, as depicted in FIGS. 1-3, are directly attached to the connecting member 18, the first and second upright members 22 and 24 can be directly attached to the first and second support members 14 and 16, or can be directly attached to both the first and second support members 14 and 16 and the connecting member 18.

As depicted in FIGS. 1 and 2, the rotatable carrier 28 includes an axis of rotation A, and a cradle portion 30 for supporting the replica human spine S thereon. The rotatable carrier 28 also includes a first end 32 and a second end 34, and is supported at the first and second ends 32 and 34 by the first and second upright members 22 and 24, respectively. The rotatable carrier 28 includes a first arm portion 36 located at the first end 32 thereof, a second arm portion 38 at the second end 34 thereof, and the cradle portion 30 is attached to the first and second arm portions 36 and 38.

The first arm portion 36 is rotatably attached to the first upright member 22, and the second arm portion 38 is rotatably attached to the second upright member 24. As discussed below, controlled rotation of the first arm portion 36 serves also in rotating the cradle portion 30.

As discussed below, rotatable movement of the first arm portion 36 relative to the first upright member 22 is facilitated by a gear mechanism 40 and a rotatable shaft 42. Furthermore, rotatable movement of the second arm portion 38 relative to the second upright member 24 is facilitated by an axle assembly 43. The axle assembly 43 is attached to the second upright member 24 and the second arm portion 38.

As depicted in FIGS. 1-3, the gear mechanism 40 includes a gear housing 44 that is attached to the first upright member 22. The gear housing 44 contains a spur gear (not shown) and a worm gear (not shown) that are supported for rotation within the gear housing 44 and are operatively engaged to one another. The rotatable shaft 42 is attached to the first arm portion 36, and the rotatable shaft 42 extends through the gear housing 44 and is also attached to the spur gear. Furthermore, a first input shaft (not shown) extends through the gear housing 44, and one end of the input shaft is attached to the worm gear and the other end of the input shaft is attached to a hand wheel 48.

Rotation of the hand wheel 48 and the first input shaft via user input, and the corresponding operative interconnection between the worm gear and the spur gear serves in rotating the rotatable shaft 42, and hence, rotating the first arm portion 36 attached thereto. As such, rotation of the hand wheel 48 is translated into rotation of the first arm portion 36 by the gear mechanism 40. Furthermore, interaction between the spur gear and the worm gear also holds the first arm portion 36 in the rotation position dictated by the rotation position of the hand wheel 48. Thus, the rotation position of the first arm portion 36 can be selected by the selected rotation position of the hand wheel 48. A scale can be provided to facilitate measurement of the rotation position of the first arm portion 36.

While the spur gear is attached to the rotatable shaft 42, and the worm gear is attached to the first input shaft, the arrangement can be reversed within the gear housing 44 so long as rotation of the hand wheel 48 can be translated into rotation of the first arm portion 36, and the interaction between the spur gear and the worm gear holds the first arm portion 36 in the rotation position dictated by the rotation position of the hand wheel 48. Furthermore, a variety of other mechanisms can be used in place of the above-described components of the gear mechanism 40. For example, electrical motors with rotation selective positioning can be used to rotate the first arm portion 36 and hold the first arm portion 36 in the selected rotation position.

Given that the first arm portion 36 rotatably attached to the first upright member 22, the second arm portion 38 is attached to the second upright member 24, and the cradle portion 30 is attached to the first and second arm portions 36 and 38, controlled rotation of the first arm portion 36 via rotation of the hand wheel 48 serves in rotating the cradle portion 30 and the replica human spine S provided thereon. As depicted in FIGS. 1 and 2, the axis of rotation A of the rotatable carrier 28 (and hence the cradle portion 30 and the replica human spine S provided thereon) extends through the rotatable shaft and the axle assembly 43.

The cradle portion 30 includes a first transverse member 50, a second transverse member 52, and a longitudinal member 54 attached between the first and second transverse members 50 and 52. The first and second transverse members 50 and 52 are oriented transversely to the axis of rotation A of the rotatable carrier 28, and the longitudinal member 56 is substantially aligned with the axis of rotation of the rotatable carrier 28. The first transverse member 50 is attached to the first arm portion 36, and the second transverse member 52 is attached to the second arm portion 38.

The first and second transverse members 50 and 52 and the longitudinal member 54 define an area for receiving the replica human spine S, and these members can be provided with componentry for supporting the replica human spine S in this area. To illustrate, a first adjustment mechanism 60 and a second adjustment mechanism 62 can be used to support and manipulate portions of the replica human spine S. The replica human spine S can also be attached to the first arm portion 36 via a connector 63.

The first and second adjustment mechanisms 60 and 62 are moveable relative to the remainder of the cradle portion 30 using a first truck 64, a second truck 66, and a track 68 provided on the longitudinal member 54.

The first and second truck 64 and 66 are slidable along the track 68, and the first adjustment mechanism 60 is attached to the first truck 64 and the second adjustment mechanism 62 is attached to the second truck 66. As such, the first and second adjustment mechanisms 60 and 62 are slidable along the track 68 using the slidable first and second trucks 64 and 66, and such slidable movement allows the first and second adjustment mechanisms 60 and 62 to be positioned and repositioned relative to the track 68 in order to support the replica human spine S in different places.

Figure 4:
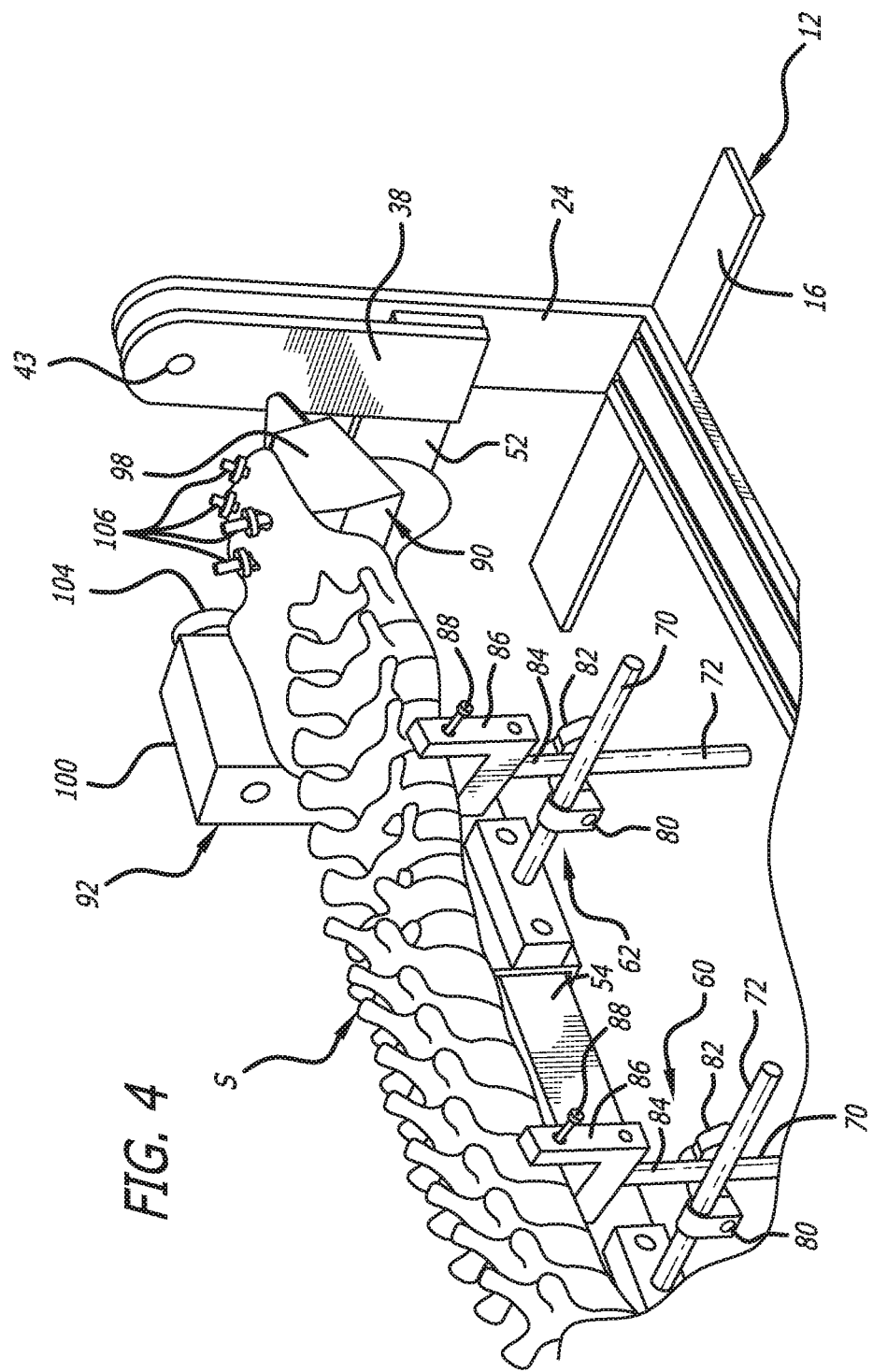
FIG. 4 is a front perspective view of two adjustment mechanisms of the simulation device or simulator of FIG. 1.
Figure 5:
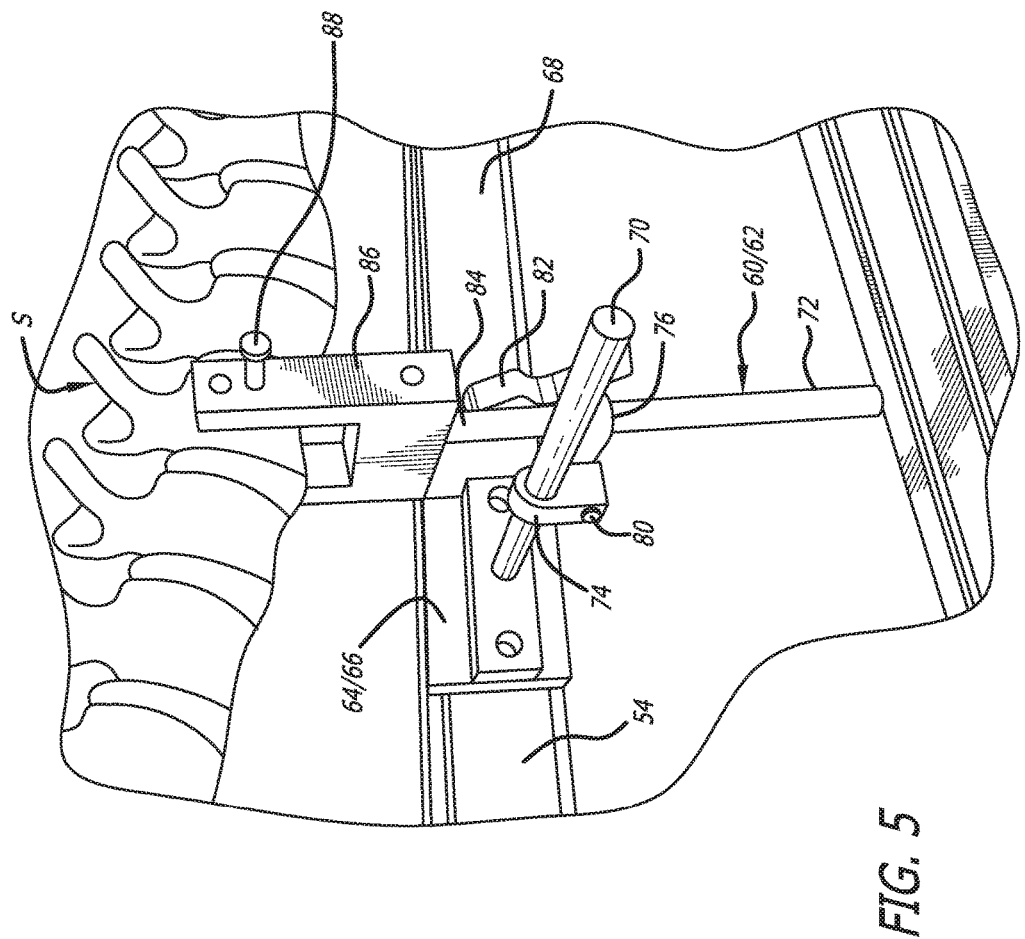
FIG. 5 is a front perspective view of one of the two adjustment mechanisms of FIG. 5.
Figure 6:
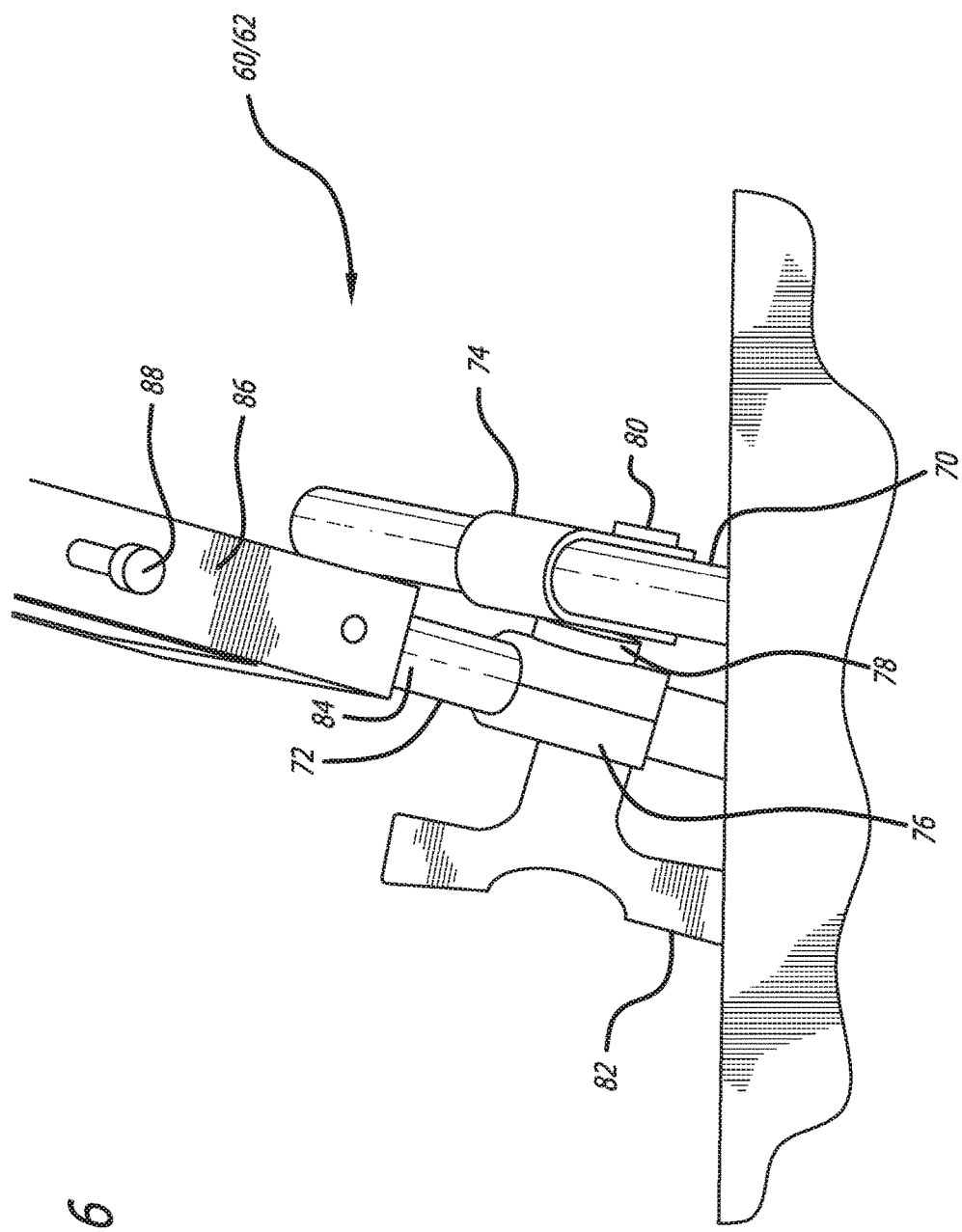
FIG. 6 is a rear top perspective view of a portion of one of the two adjustment mechanisms of FIG. 5.
Figure 7:
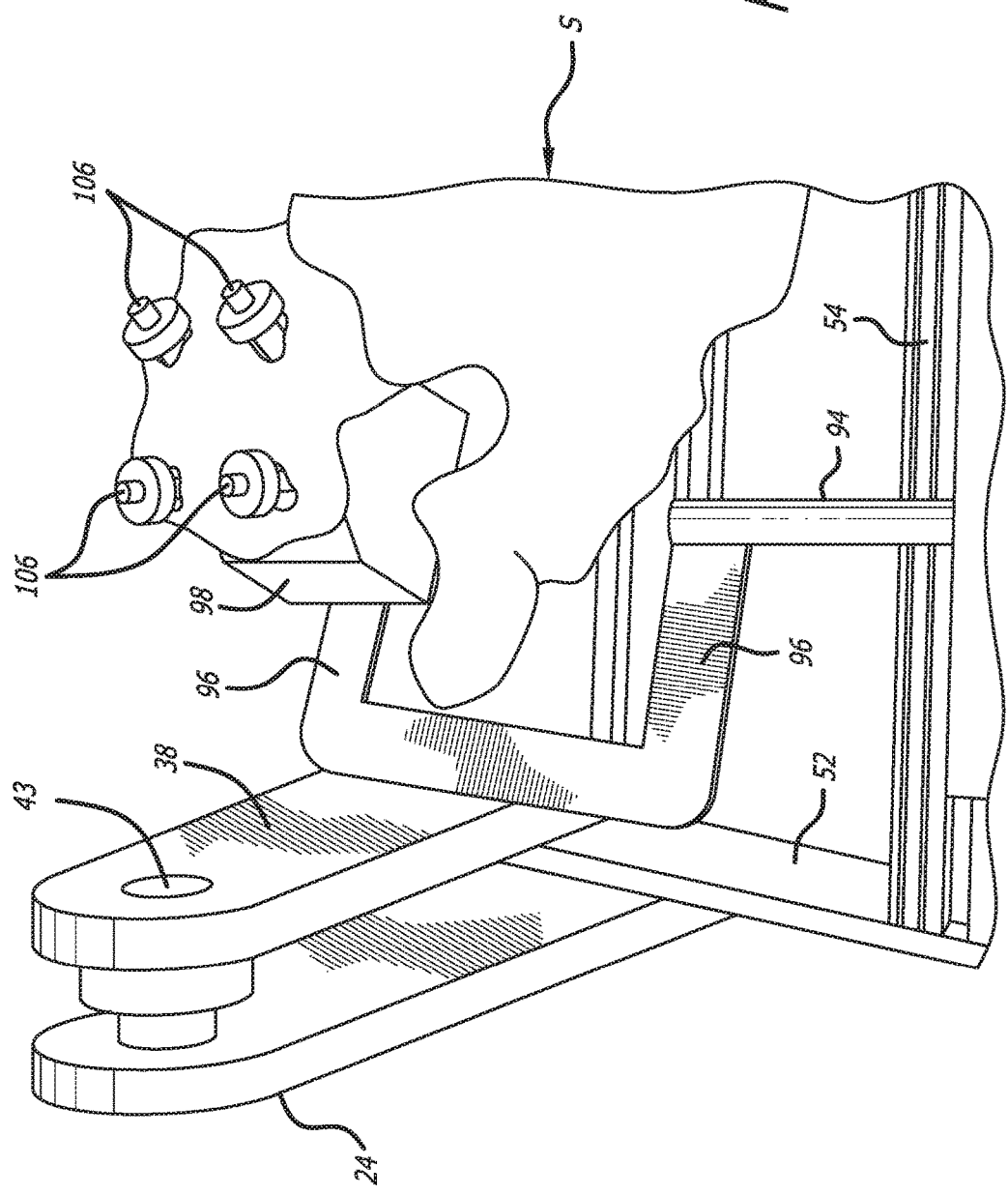
FIG. 7 is a rear top perspective view of another adjustment mechanism of the simulation device or simulator of FIG. 1.

In addition to the positioning and repositioning afforded by the slidable first and second trucks 64 and 66, the first and second adjustment mechanisms 60 and 62 themselves afford further adjustability. As depicted in FIGS. 4-6, each of the first and second adjustment mechanisms 60 and 62 include a first rod 70, a second rod 72, a first collar portion 74, a second collar portion 76, washers 78, a threaded bolt 80, and a knob portion 82. The adjustability of the first and second adjustment mechanisms 60 and 62 can serve in simulating the adjustment of the replica human spinal S in the sagittal and coronal planes.

The first and second collar portions 74 and 76 of each of the first and second adjustment mechanisms 60 and 62 include apertures for receiving the first and second rods 70 and 72, respectively. Furthermore, the first and second collar portions 74 and 76 of each of the first and second adjustment mechanisms 60 and 62 are attached to one another using the threaded bolt 80 and the knob portion 82. To facilitate such attachment, the threaded bolt 80 is inserted through apertures form through the first and second collar portions 74 and 76 of each of the first and second adjustment mechanisms 60 and 62, and the knob portion 82 is threaded onto the threaded bolt 80. The washers 78 can also be received on the threaded bolt 80 of each of the first and second adjustment mechanisms 60 and 62, and can be used to space apart the first and second collar portions 74 and 76 and to space apart the second collar portion 76 and the knob portion 82. The first and second collar portions 74 and 76 of each of the first and second adjustment mechanisms 60 and 62 are rotatable relative to one another on the threaded bolt 80.

The first rods 70 of the first and second adjustment mechanisms 60 and 62 are fixedly attached to and extend outwardly from the slidable first and second trucks 64 and 66, respectively, and for each of the first and second adjustment mechanisms 60 and 62, the first collar portion 74 is received on the first rod 70, and the second collar portion 76 is received on the second rod 72. For each of the first and second adjustment mechanisms 60 and 62, the first collar portion 74 is inwardly and outwardly adjustable on the first rod 70, the second rod 72 is upwardly and downwardly adjustable on the second collar portion 76, and the second rod 72 is rotatably adjustable relative to the first rod 70 via rotation of the second collar portion 76 relative to the first collar portion 74. Tightening of the knob portion 82 onto to the treaded bolt 80 serves in fixing the portions of the first and adjustment mechanisms 60 and 62 relative to one another.

These adjustments facilitate the positioning and repositioning of a distal end 84 of the second rod 72 of each of the first and second adjustment mechanisms 60 and 62. A support collar 86 can be provided on the distal end 84 of the second rod 72 of each of the first and second adjustment mechanisms 60 and 62 to support a portion the replica human spine S, and fasteners 88 can be used to attach the portion of the replica human spine S to the support collar 86. Given the adjustability of the first and second adjustment mechanisms 60 and 62, the position of the replica human spine S can be manipulated into a variety of positions. The positions can simulate the position of a human spine affected by different pathologies and/or the position of a human spine during different surgical procedures performed thereon.

Further manipulation of the replica human spine S can be provided by a third adjustment mechanism 90 Like the first and second adjustment mechanisms 60 and 62, the third adjustment mechanism 90 is moveable relative to the remainder of the cradle portion 30, and can serve in simulating the adjustment of the replica human spinal S in the sagittal and coronal planes.

The third adjustment mechanism 90 includes a gear mechanism 92, a rotatable shaft 94, an adjustment armature 96, and an adjustment block 98. The adjustment block 98 is attached to the adjustment armature 96, and the adjustment armature 96 is attached to the rotatable shaft 94. Furthermore, the gear mechanism 92 facilitates rotation of the rotatable shaft 94. As such, the adjustment armature 96 and the adjustment block 98 rotate with the rotatable shaft 94.

The gear mechanism 92 includes a gear housing 100 that is slidable along a track 102 provided on the longitudinal member 54. The gear housing 100 contains a spur gear (not shown) and a worm gear (not shown) that are supported for rotation within the gear housing 100 and are operatively engaged to one another. The rotatable shaft 94 extends through the gear housing 100 and is attached to the spur gear. Furthermore, a second input shaft (not shown) extends through the gear housing 100, and one end of the input shaft is attached to the worm gear and the other end of the input shaft is attached to a hand wheel 104.

Rotation of the hand wheel 104 and the second input shaft via user input, and the corresponding operative interconnection between the worm gear and the spur gear serves in rotating the rotatable shaft 94, and hence, rotating the adjustment armature 96 and the adjustment block 98 attached thereto. As such, rotation of the hand wheel 104 is translated into rotation of the adjustment armature 96 and the adjustment block 98. Furthermore, interaction between the spur gear and the worm gear also holds the adjustment armature 96 and the adjustment block 98 in the rotation position dictated by the rotation position of the hand wheel 104. Thus, the rotation position of the adjustment armature 96 and the adjustment block 98 can be selected by the selected rotation position of the hand wheel 104. A scale can be provided to facilitate measurement of the rotation position of the first arm portion 36.

While the spur gear is attached to the rotatable shaft 94, and the worm gear is attached to the second input shaft, the arrangement can be reversed with the gear housing 100 so long as rotation of the hand wheel 104 can be translated into rotation of the adjustment armature 96 and the adjustment block 98, and the interaction between the spur gear and the worm gear holds the adjustment armature 96 and the adjustment block 98 in the rotation position dictated by the rotation position of the hand wheel 104. Furthermore, a variety of other mechanisms can be used in place of the above-described components of the gear mechanism 92. For example, electrical motors with rotation selective positioning can be used to rotate the adjustment armature 96 and the adjustment block 98, and hold the adjustment armature 96 and the adjustment block 98 in position.

Like the first and second adjustment mechanisms 60 and 62, the third adjustment mechanism 90 can be used to support and manipulate a portion of the replica human spine S. For example, portions of the replica human spine S can be attached to the adjustment armature 96 and/or the adjustment block 98. As depicted in FIGS. 1-4 and 7, the sacrum of the replica human spine S is attached to the adjustment block 98 using fasteners 106. Thus, the rotation of the adjustment armature 96 and the adjustment block 98 serve in rotating the sacrum, and such rotation manipulates portions of the remainder of the replica human spine S.

The manipulation of the replica human spine S using the first, second, and third adjustment mechanisms 60, 62, and 90, and using the position of the slidable first and second trucks 64 and 66 on the track 68, and the position of the gear housing 100 on the track 102 allows the replica human spine S to be positioned and repositioned on the simulator 10. Rotation of the rotatable carrier 28 and the cradle portion 30 supporting the replica human spine S affords additional manipulation of the position of the replica human spine S. The positioning and repositioning of the replica human spine S afforded by the simulator 10 allows simulation and visualization of the position of a human spine affected by different pathologies and/or in different positions to afford different surgical procedures for training purposes.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

We claim:

1. A simulation device for simulating a position of a replica human spine due to different pathologies and different surgical positions, the simulation device comprising:
   a base portion including at least a first upright member and a second upright member, the first and second upright members being spaced apart a first distance;
   a carrier portion rotatably attached to the base portion, the carrier portion including at least a first arm portion, a second arm portion, and a cradle portion attached between the first and second arm portions;
   the first arm portion being rotatably attached to the first upright member, the second arm portion being rotatably attached to the second upright member, and the first and second arm portions rotating about a rotational axis, the cradle portion including at least a longitudinal member extending approximately the first distance, and the longitudinal member being substantially aligned with the rotational axis; the longitudinal member supporting at least a first adjuster and a second adjuster for positioning and repositioning portions of the replica human spine;
   the first adjuster including a first adjustment rod, a second adjustment rod, a first collar portion, a second collar portion, and a distal end portion for supporting a first portion of the replica human spine, the first adjustment rod extending outwardly from the longitudinal member, the first collar portion being movably attached to the first adjustment rod, the first and second collar portions being rotatably attached to one another, the second adjustment rod being movably attached to the second collar portion, and the distal end portion being attached to the second adjustment rod, wherein the first collar portion is movable via adjustment relative to the first adjustment rod in a first direction, and the second adjustment rod is movable via adjustment relative to the second collar portion in a second direction, the adjustment of the first adjuster affording positioning and repositioning of the distal end portion and the first portion of the replica human spine supported thereby; and
   the second adjuster including a first gear mechanism, a first rotatable shaft, and an armature portion for supporting a second portion of the replica human spine, the armature portion being attached to the first rotatable shaft, the first rotatable shaft being rotatably adjustable by the first gear mechanism, wherein the armature portion is moveable via adjustment of the first rotatable shaft, the adjustment of the second adjuster affording positioning and repositioning of the armature portion and second portion of the replica human spine supported thereby.

2. The simulation device of claim 1, wherein the positioning and repositioning of the first portion of the replica human spine afforded by the adjustment of the first adjuster, and the positioning and repositioning of the second portion of the replica human spine afforded by the adjustment of the second adjuster serves to articulate the replica human spine to simulate different pathologies and different surgical positions.

3. The simulation device of claim 1, wherein the first gear mechanism further includes a first handwheel operatively connected to the first rotatable shaft, the first handwheel being rotatable via user input, and rotation of the first handwheel serving to rotate the first rotatable shaft and the armature portion of the second adjuster.

4. The simulation device of claim 1, further comprising a second gear mechanism and a second rotatable shaft for facilitating rotation of the first arm portion relative to the first upright member, the first arm portion being attached to the second rotatable shaft, the second rotatable shaft being rotatably adjustable by the second gear mechanism.

5. The simulation device of claim 4, wherein the second gear mechanism includes a gear housing and a second handwheel, the gear housing being positioned between the first upright member and the first arm portion, the second handwheel being operatively connected to the second rotatable shaft, the second handwheel being rotatable via user input, and rotation of the second handwheel serving to rotate the second rotatable shaft and the first arm portion.

6. The simulation device of claim 5, wherein rotation of the first arm portion serves in rotating the cradle portion, the first and second adjusters supported by the longitudinal member of the cradle portion, and the replica human spine.

7. The simulation device of claim 1, further comprising a first track and a second track provided on the longitudinal member, the first adjuster being moveable on the first track and the second adjuster being moveable on the second track.

8. A simulation device for simulating a position of a replica human spine due to different pathologies and different surgical positions, the simulation device comprising:
a first upright member and a second upright member, the first and second upright members being spaced apart a first distance;
a carrier portion including at least a first arm portion, a second arm portion, and a cradle portion attached between the first and second arm portions, the first arm portion being rotatably attached to the first upright member and the second arm portion being rotatably attached to the second upright member, the first and second arm portions rotating about a rotational axis;
the cradle portion including at least a longitudinal member being substantially aligned with the rotational axis;
a first adjuster supported by the longitudinal member of the cradle portion, the first adjuster including a first adjustment rod, a second adjustment rod, a first collar portion, a second collar portion, and a distal end portion attached to the second adjustment rod for supporting a first portion of the replica human spine, the first and second collar portions being attached to one another, the first collar portion being moveably attached to the first adjustment rod, the second adjustment rod being moveably attached to the second collar portion, wherein the first collar portion is movable via adjustment relative to the first adjustment rod in a first direction, and the second adjustment rod is movable via adjustment relative to the second collar portion in a second direction, the adjustment of the first adjuster affording positioning and repositioning of the distal end portion and the first portion of the replica human spine supported thereby; and
a second adjuster supported by the longitudinal member of the cradle portion, the second adjuster including a first gear mechanism, a first rotatable shaft, and an armature portion for supporting a second portion of the replica human spine, the armature portion being attached to the first rotatable shaft, the first rotatable shaft being rotatably adjustable by the first gear mechanism, wherein the armature portion is moveable via adjustment of the first rotatable shaft, the adjustment of the second adjuster affording positioning and repositioning of the armature portion and second portion of the replica human spine supported thereby.

9. The simulation device of claim 8, wherein the positioning and repositioning of the first portion of the replica human spine afforded by the adjustment of the first adjuster, and the positioning and repositioning of the second portion of the replica human spine afforded by the adjustment of the second adjuster serves to articulate the replica human spine to simulate different pathologies and different surgical positions.

10. The simulation device of claim 8, wherein the first gear mechanism further includes a first handwheel operatively connected to the first rotatable shaft, the first handwheel being rotatable via user input, and rotation of the first handwheel serving to rotate the first rotatable shaft and the armature portion of the second adjuster.

11. The simulation device of claim 8, further comprising a second gear mechanism and a second rotatable shaft for facilitating rotation of the first arm portion relative to the first upright member, the first arm portion being attached to the second rotatable shaft, the second rotatable shaft being rotatably adjustable by the second gear mechanism.

12. The simulation device of claim 11, wherein the second gear mechanism includes a gear housing and a second handwheel, the gear housing being positioned between the first upright member and the first arm portion, the second handwheel being operatively connected to the second rotatable shaft, the second handwheel being rotatable via user input, and rotation of the second handwheel serving to rotate the second rotatable shaft and the first arm portion.

13. The simulation device of claim 12, wherein rotation of the first arm portion serves in rotating the cradle portion, the first and second adjusters supported by the longitudinal member of the cradle portion, and the replica human spine.

14. The simulation device of claim 8, further comprising a first track and a second track provided on the longitudinal member, the first adjuster being moveable on the first track and the second adjuster being moveable on the second track.

15. A method of simulating positions of a human spine due to different pathologies and different surgical positions using a replica human spine and a simulation device, the method comprising:
positioning the simulation device on a support surface, the height of the simulation device approximating a height of a patient during surgery on the spine of the patient;
supporting a first portion of the replica human spine on a first adjuster of the simulation device, the first adjuster including a first adjustment rod, a second adjustment rod, a first collar portion, a second collar portion, and a distal end contacting the first portion of the replica human spine;

supporting a second portion of the replica human spine on a second adjuster of the simulation device, the second adjuster including a first gear mechanism and an armature portion contacting the second portion of the replica human spine;

adjusting the position of the distal end of the first adjuster and the first portion of the replica human spine by at least one of moving the first collar portion relative to the first adjustment rod, moving the second adjustment rod relative to the second collar portion, and rotating the first and second collar portions relative to one another; and adjusting the position of the armature portion of the second adjuster and the second portion of the replica human spine by actuating the first gear mechanism to rotate the armature portion;

wherein the adjustment of the first and second adjusters serve to articulate positions of the first and second portions of the replica human spine to simulate the different pathologies and the different surgical positions of the human spine.

16. The method of claim 15, further comprising moving the first adjuster along a first track of the simulation device, and moving the second adjuster along a second track of the simulation device, wherein the movement of the first adjuster along the first track, and the movement of the second adjuster along the second track serve to further articulate positions of the first and second portions of the replica human spine to simulate the different pathologies and the different surgical positions of the human spine.

17. The method of claim 15, further comprising supporting the first and second adjusters on a longitudinal member of a cradle portion, supporting the cradle portion between a first upright member and a second upright member.

18. The method of claim 17, further comprising rotating, about a rotational axis extending through the first and second upright members, the cradle portion and the first and second adjusters and the first and second portions of the replica human spine supported thereby.

19. The method of claim 18, further comprising supporting the cradle portion on a first arm portion and a second arm portion, wherein a second gear mechanism and a rotatable shaft facilitates rotation of the first arm portion relative to the first upright member, the first arm portion being attached to the rotatable shaft, the rotatable shaft being rotatably adjustable by the second gear mechanism.

20. The method of claim 15, wherein the second adjuster further includes a rotatable shaft and a handwheel, the armature portion being attached to the rotatable shaft, the rotatable shaft being rotatably adjustable by the first gear mechanism, the handwheel operatively connected to the rotatable shaft, the handwheel being rotatable via user input, and rotation of the handwheel serving to rotate the rotatable shaft and the armature portion of the second adjuster.

* * * * *